(12) United States Patent
Foser et al.

(10) Patent No.: US 8,926,250 B2
(45) Date of Patent: Jan. 6, 2015

(54) FASTENING DEVICE

(75) Inventors: Thomas Foser, Balzers (LI); Wolfram Schwertner, Sevelen (CH); Guenther Domani, Frastanz (AT)

(73) Assignee: Hilti Aktiengesellschaft, Schaan (LI)

( * ) Notice: Subject to any disclaimer, the term of this patent is extended or adjusted under 35 U.S.C. 154(b) by 60 days.

(21) Appl. No.: 13/283,735

(22) Filed: Oct. 28, 2011

(65) Prior Publication Data

US 2012/0114446 A1 May 10, 2012

(30) Foreign Application Priority Data

Nov. 4, 2010 (DE) .......................... 10 2010 043 425

(51) Int. Cl.
*F16B 15/00* (2006.01)
*F16B 43/00* (2006.01)

(52) U.S. Cl.
CPC ................. *F16B 15/00* (2013.01); *F16B 43/00* (2013.01)
USPC .......................................... 411/441; 411/531

(58) Field of Classification Search
USPC .............. 411/38, 440, 441, 531, 10, 9
See application file for complete search history.

(56) References Cited

U.S. PATENT DOCUMENTS

| | | | | |
|---|---|---|---|---|
| 2,961,210 A * | 11/1960 | Pfaff et al. | | 248/74.5 |
| 3,320,845 A * | 5/1967 | Eschweiler | | 411/441 |
| 3,377,903 A * | 4/1968 | Korte | | 411/441 |
| 3,382,751 A | 5/1968 | Kopf | | 85/10 |
| 3,490,329 A * | 1/1970 | Pratorius | | 411/441 |
| 3,491,648 A * | 1/1970 | Thurner | | 411/439 |
| 4,112,693 A * | 9/1978 | Collin et al. | | 405/302.1 |
| 4,371,293 A * | 2/1983 | Wilcox et al. | | 405/302.1 |
| 4,445,808 A * | 5/1984 | Arya | | 405/302.1 |
| 4,915,561 A | 4/1990 | Buhri et al. | | 411/439 |
| 5,292,216 A | 3/1994 | Van Allman | | 411/441 |
| 5,443,345 A * | 8/1995 | Gupta | | 411/441 |
| 5,569,010 A | 10/1996 | Janssen et al. | | 411/441 |
| 5,624,220 A * | 4/1997 | Janssen et al. | | 411/441 |
| 5,628,587 A * | 5/1997 | Lesslie | | 405/302.1 |
| 5,634,756 A * | 6/1997 | Losada | | 411/441 |
| 6,352,398 B1 * | 3/2002 | Gonnet | | 411/441 |
| 6,824,342 B2 | 11/2004 | Gassmann et al. | | 411/441 |
| 7,393,169 B2 | 7/2008 | Suessenbach | | 411/38 |
| 8,052,366 B2 * | 11/2011 | Thompson | | 411/441 |

FOREIGN PATENT DOCUMENTS

| | | |
|---|---|---|
| AT | 184 524 B | 1/1956 |
| DE | 15 00 868 C | 10/1971 |
| DE | 37 43 049 A1 | 6/1989 |
| DE | 295 18 734 U1 | 1/1996 |
| DE | 102 29 141 C1 | 7/2003 |
| EP | 1 710 454 A1 | 10/2006 |

* cited by examiner

Primary Examiner — Flemming Saether
(74) Attorney, Agent, or Firm — Davidson, Davidson & Kappel, LLC

(57) ABSTRACT

A device for fastening a first object to a second object, including a fastening element and a ring element. The ring element has a predetermined bending point.

24 Claims, 1 Drawing Sheet

FASTENING DEVICE

This claims the benefit of German Patent Application DE 10 2010 043 425.6, filed Nov. 4, 2011 and hereby incorporated by reference herein.

The present invention relates to a device for fastening a first object to a second object, comprising a fastening element and a ring element.

BACKGROUND

Such fastening devices normally have a nail or the like as the fastening element, which can be driven into the second object, for example, a substrate. The ring element is slipped onto the shank of the nail and it has a counterbearing on which the first object is supported. If applicable, the counterbearing or the ring element, in turn, is supported by the head of the fastening element. Moreover, in certain cases, such devices also have a washer that transfers the holding force from the counterbearing to the first object.

Fastening devices are known in which the ring element has a collar through which the shank of a nail is inserted in the fastening direction and which, with a uniform transition curvature, makes the transition into a flank of the counterbearing. While the fastening device is being driven into the substrate, the collar is compressed in the fastening direction and, in turn, it exerts a force that acts radially outwards onto the counterbearing. Therefore, the counterbearing is first deformed outwards, a process in which, due to the transition curvature, an outer edge of the counterbearing is ultimately raised in a direction that is opposite from the fastening direction. Under certain circumstances, the outer edge then protrudes from the first object that is to be fastened.

SUMMARY OF THE INVENTION

It is an object of the present invention to provide a device for fastening a first object to a second object, comprising a fastening element that has an elongated shank, comprising a ring element that has a collar through which the shank can be inserted in the fastening direction, and comprising a counterbearing on which the first object can be supported, whereby the ring element has a predetermined bending point between the collar and the counterbearing. A predetermined bending of the ring element then causes the counterbearing to be pushed radially outwards in a defined manner when the device is driven into a substrate. This reduces the tendency of a radial outer edge of the counterbearing to become raised in a direction that is opposite from the fastening direction. Under certain circumstances, the radial outer edge is not raised at all during the driving procedure.

A preferred embodiment is characterized in that the predetermined bending point consists of a bending line. Especially preferably, the bending line runs perpendicular to the fastening direction. Advantageously, the predetermined bending point is already bent, especially with a curvature radius of less than 1 mm on the inside of the bending line. Preferably, the curvature radius is less than 0.8 mm, especially preferably less than 0.6 mm. This ensures that the ring element bends along the bending line during the driving procedure. The bending angle of the bending line preferably amounts to between 20° and 80°, especially preferably between 30° and 60°.

Another preferred embodiment is characterized in that the fastening element is held in the collar, in particular, it is held non-positively.

Another preferred embodiment is characterized in that the fastening element has a head that projects beyond the shank, perpendicular to the lengthwise direction of the shank.

Another preferred embodiment is characterized in that the shank has a first and a second end, and whereby the head is arranged at the first end, and/or the second end has a tip.

Another preferred embodiment is characterized in that the ring element surrounds the shank like a ring, particularly with an essentially circular inner and/or outer contour.

Another preferred embodiment is characterized in that the fastening element and/or the ring element comprises a metal and/or an alloy, especially it consists of a metal and/or an alloy.

Another preferred embodiment is characterized in that the collar and/or the counterbearing reaches the predetermined bending point.

Another preferred embodiment is characterized in that, at the predetermined bending point, the collar has a smaller angle relative to the fastening direction than the counterbearing does. In particular, the angle at the collar is 0°, in contrast to which the counterbearing projects outwards, especially radially, from the collar.

Another preferred embodiment is characterized in that the collar runs parallel to the fastening direction, at least in certain areas.

Another preferred embodiment is characterized in that the counterbearing especially comprises especially a first flank that reaches the predetermined bending point.

Another preferred embodiment is characterized in that the counterbearing has a second flank that is adjacent to the first flank, especially that is directly adjacent to the first flank.

Another preferred embodiment is characterized in that the second flank extends radially outwards from the first flank, especially from a radial outer edge of the first flank.

Another preferred embodiment is characterized in that the counterbearing has a stiffening rib. Especially preferably, the counterbearing has two or more stiffening ribs which are especially distributed over the circumference of the ring element. Preferably, the stiffening rib extends from an inner edge of the first flank to an outer edge of the first flank, or from an inner edge of the counterbearing to an outer edge of the counterbearing. Preferably, the stiffening rib reaches the predetermined bending point. According to a preferred embodiment, the stiffening rib encompasses a bulge of the counterbearing that extends in a direction that is opposite from the fastening direction. According to another embodiment, the stiffening rib encompasses a bulge of the counterbearing in the fastening direction.

BRIEF DESCRIPTION OF THE DRAWINGS

The invention will be described in greater detail on the basis of an embodiment making reference to the drawings. The following is shown.

DETAILED DESCRIPTION

Figure 1:
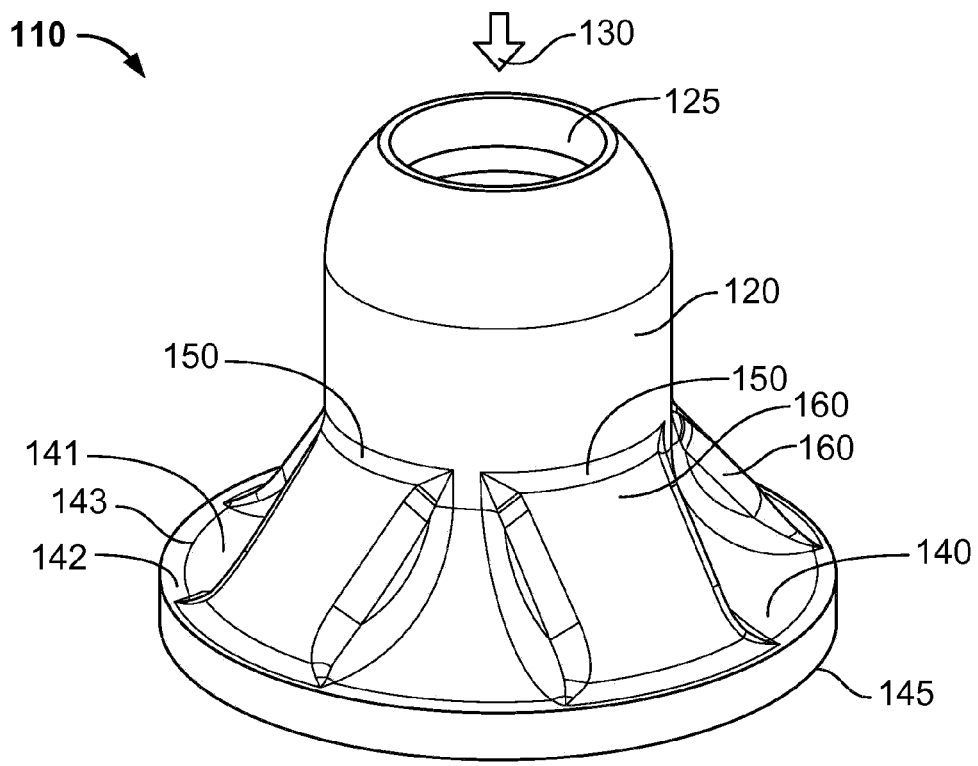
FIG. 1: an oblique view of a ring element.

FIG. 1 depicts an oblique view of a ring element 110 of a device for fastening a first object (not shown here), for instance, one or more panels, to a second object (likewise not shown here), for example, another panel. The first object is preferably made of a metal, especially steel or aluminum, of wood or of plastic, while the second object is preferably made of concrete, of metal, especially metal or aluminum, of wood or of plastic.

The ring element 110 comprises a collar 120 through which a fastening element (not shown here), especially the shank of the fastening element, can be inserted in the fastening direction 130. Preferably, the fastening element is held by press fit on the circular inner edge 125 of the collar 120. For the most part, the collar runs parallel to the fastening direction and is configured especially cylindrically in this area.

Furthermore, the ring element 110 comprises a counterbearing 140 on which the first object can be supported. The counterbearing 140 has a first flank 141 and a second flank 142 that is directly adjacent to the first flank, whereby the second flank 142 extends radially outwards from a radial outer edge 143 of the first flank 141 to an outer edge 145 of the counterbearing 140. The inner edge 125 and the outer edge 145 respectively form the inner and outer contours of the ring element 110, so that the ring element surrounds the fastening element (not shown here) like a ring.

Between the collar 120 and the counterbearing 140, the ring element 110 has several predetermined bending points configured as bending lines 150 that are already bent. The curvature radius of the material of the ring element 110 on the inside of the bending lines visible in FIG. 1 is preferably 0.5 mm. The bending lines 150 run perpendicular to the fastening direction 130 along and around the collar 120, whereby the collar 120 reaches the bending lines 50.

The counterbearing 140 has several, especially four, stiffening ribs 160 that are uniformly distributed along the circumference of the ring element 110 and that each extend at the bending lines 150 from the inner edge of the counterbearing 140 or of the first flank 141 all the way to the outer edge of the counterbearing 140 or of the first flank 141. Therefore, the stiffening ribs 160 reach the appertaining bending lines 150. Each stiffening rib 160 is formed by a bulge of the counterbearing 140 that extends in a direction that is opposite from the fastening direction, and has an inclination angle of 40° relative to the fastening direction 130. Consequently, the bending angle of the bending lines 150 is likewise 40°. The ring element 110 is made of a metal or an alloy by means of a punching or deep-drawing process.

Figure 2:
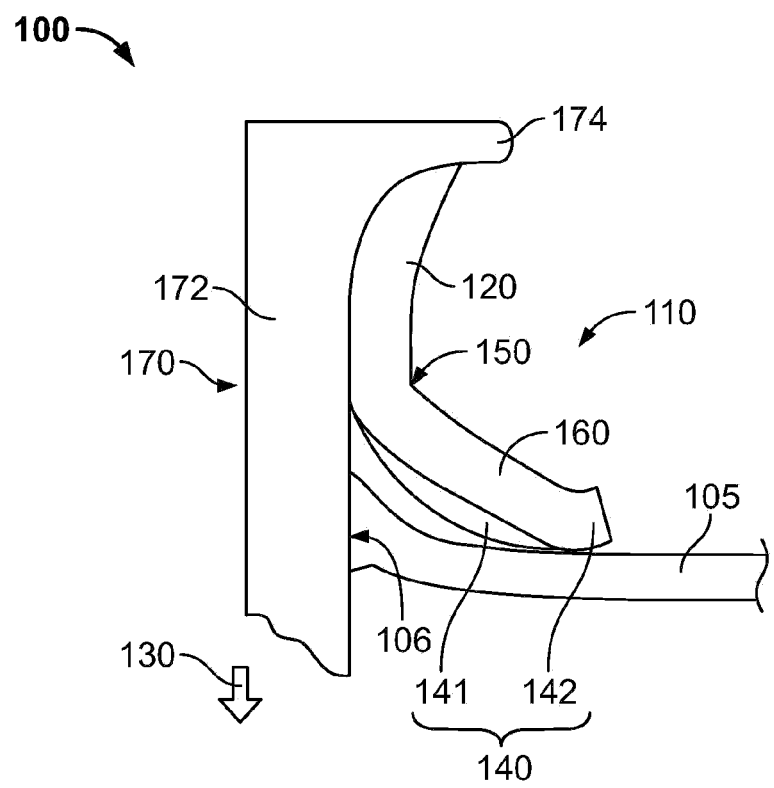
FIG. 2: a sectional view of a fastening device.

FIG. 2 shows a longitudinal sectional view of a device 100 for fastening a first object 105, here a panel, to a second object (not shown here), for instance, another panel, by means of a fastening procedure. The device 100 comprises a fastening element 170 as well as ring element 110 shown in FIG. 1. The fastening element 170 is configured as a nail and has a shank 172 on whose end there is a head 174 that projects beyond the shank 172 and at whose other end there is a tip (not shown here).

The ring element 110 comprises collar 120 through which the fastening element 170 is inserted. Moreover, the ring element 110 comprises counterbearing 140 on which the first object 105 is supported. The counterbearing 140 has a first flank 141 and a second flank 142 that is directly adjacent to the first flank 141, whereby the second flank 142 extends radially outwards from the first flank 141. The counterbearing 140 has at least one stiffening rib 160 that is formed by a bulge of the counterbearing 140 that extends in a direction that is opposite from the fastening direction.

For purposes of fastening the first object 105 to the second object, the fastening element 170 is driven into the second object in the fastening direction 130. In this process, the ring element 110 is clamped in the fastening direction 130 and compressed between the head 174 of the fastening element 170 and the first object 105, so that the collar 120 is deformed and comes into contact with an outer contour of the fastening element 170. Owing to the predetermined bending point situated between the collar 120 and the counterbearing 140 or its stiffening rib 160, during the compression, the ring element 110 is bent along an encircling bending line 150 in such a way that a bending angle of about 60° is formed between the collar 120 and the counterbearing 140 or its stiffening rib 160. This bending angle, however, depends on the fastening procedure, especially on the materials of which the first and second objects are made, as well as on the amount of energy with which the fastening element 170 is driven in. Particularly in the case of high levels of driving energy, a bending angle of considerably more than 90° can be achieved between the collar 120 and the counterbearing 140 or its stiffening rib 160.

The first object 105 is then supported from below on the counterbearing 140 or on its second flank 142, preferably in an area that lies radially outside. In certain cases, the fastening element 170 is supported against shearing forces, and the risk of tilting of the fastening element 170 is diminished or avoided. It can be seen in FIG. 2 that the first object 105 was likewise deformed in the area of its contact surface 106 with the fastening element 170 during the fastening procedure. Due to the stiffening brought about by the stiffening rib 160, in certain cases, a moment of resistance of the device 100 against forces that would pull it out of the second object is increased, so that a high load-bearing capacity can be achieved for the device 100.

The invention was described making reference to a fastening device. However, express mention is hereby made of the fact that the invention is also suitable for other purposes.

What is claimed is:

1. A device for fastening a first object to a second object, the device comprising:
    a fastener including an elongated shank; and
    a ring having a collar, the shank being insertable through the collar in a fastening direction, the ring including a counterbearing having a circular outer contour, the first object supportable on the counterbearing, the ring having a predetermined bending point between the collar and the counterbearing, the counterbearing including at least one stiffening rib.

2. The device as recited in claim 1 wherein the predetermined bending point includes a bending line.

3. The device as recited in claim 2 wherein the bending line runs perpendicular to the fastening direction.

4. The device as recited in claim 1 wherein the fastener is held in the collar.

5. The device as recited in claim 4 wherein the fastener is held non-positively in the collar.

6. The device as recited in claim 1 wherein the fastener has a head projecting beyond the shank perpendicular to a lengthwise direction of the shank.

7. The device as recited in claim 6 wherein the shank has a first and a second end, the head being arranged at the first end and the second end having a tip.

8. The device as recited in claim 1 wherein the ring surrounds the shank.

9. The device as recited in claim 8 wherein the counterbearing has a circular outer contour.

10. The device as recited in claim 1 wherein the fastener and/or the ring includes a metal and/or an alloy.

11. The device as recited in claim 10 wherein the fastener and/or the ring consists of the metal and/or the alloy.

12. The device as recited in claim 1 wherein the collar and/or the counterbearing reaches the predetermined bending point.

13. The device according to claim 12 wherein, at the predetermined bending point, the collar has a smaller angle relative to the fastening direction than the counterbearing does.

14. The device as recited in claim 1 wherein the collar runs parallel to the fastening direction, at least in certain areas.

15. The device as recited in claim 1 wherein the counterbearing includes a first flank reaching the predetermined bending point.

16. The device as recited in claim 15 wherein the counterbearing has a second flank adjacent to the first flank.

17. The device as recited in claim 16 wherein the second flank is directly adjacent to the first flank.

18. The device as recited in claim 16 wherein the second flank extends radially outwards from the first flank.

19. The device as recited in claim 18 wherein the second flank extends from a radial outer edge of the first flank.

20. The device as recited in claim 15 wherein the stiffening rib extends to an outer edge of the first flank.

21. The device as recited in claim 1 wherein the at least one stiffening rib includes a plurality of stiffening ribs uniformly distributed along a circumference of the ring.

22. The device as recited in claim 1 wherein the stiffening rib reaches the predetermined bending point.

23. The device as recited in claim 1 wherein the stiffening rib extends to an outer edge of the counterbearing.

24. The device as recited in claim 1 wherein the stiffening rib is formed by a bulge.

* * * * *